(12) United States Patent
Taylor et al.

(10) Patent No.: US 8,801,827 B2
(45) Date of Patent: Aug. 12, 2014

(54) FERTILIZER COMPOSITION CONTAINING SULFUR AND BORON

(71) Applicant: Tiger-Sul Products (Canada) Co., Calgary (CA)

(72) Inventors: Drew P. Taylor, Gilmanton, NH (US); Richard J. Valagene, Republic, MO (US); Guy Wesley Haun, West Liberty, OH (US)

(73) Assignee: Tiger-Sul Products (Canada) Co., Calgary (CA)

( * ) Notice: Subject to any disclaimer, the term of this patent is extended or adjusted under 35 U.S.C. 154(b) by 0 days.

(21) Appl. No.: 13/657,550

(22) Filed: Oct. 22, 2012

(65) Prior Publication Data

US 2014/0109639 A1    Apr. 24, 2014

(51) Int. Cl.
*C05D 9/02* (2006.01)

(52) U.S. Cl.
USPC .................................................................. 71/31

(58) Field of Classification Search
USPC ........................................................ 71/63, 31
See application file for complete search history.

(56) References Cited

U.S. PATENT DOCUMENTS

| | | | |
|---|---|---|---|
| 4,334,906 A | 6/1982 | Young | |
| 4,572,733 A * | 2/1986 | Howard | 71/64.08 |
| 5,599,373 A | 2/1997 | Zanuccoli | |
| 6,132,485 A | 10/2000 | Sanders | |
| 6,426,083 B1 | 7/2002 | Hayati | |
| 6,749,659 B1 * | 6/2004 | Yu et al. | 71/28 |
| 8,034,148 B2 | 10/2011 | Tyler | |
| 8,221,515 B2 * | 7/2012 | Goodwin | 71/28 |
| 8,679,219 B2 * | 3/2014 | Garcia Martinez et al. | 71/31 |
| 2004/0050127 A1 * | 3/2004 | Ambri | 71/31 |
| 2012/0067094 A1 | 3/2012 | Pursell et al. | |
| 2012/0088666 A1 | 4/2012 | Gan | |

FOREIGN PATENT DOCUMENTS

| | | | |
|---|---|---|---|
| CN | 101531550 | * | 9/2009 |
| WO | WO 90/03350 | * | 4/1990 |

OTHER PUBLICATIONS

Results of the Alfalfa Fertility Trial, obtained on Oct. 22, 2012 at http://www.msue.msu.edu/objects/content_revision/download.cfm/revision_id.212193/workspace_id.108285/Results%20of%20the%20Alfalfa%20Fertility%20Trial.pdf/.
New Zealand Application No. 242541 filed on Apr. 29, 1992.

* cited by examiner

*Primary Examiner* — Wayne Langel
(74) *Attorney, Agent, or Firm* — Dorsey and Whitney LLP

(57) ABSTRACT

A fertilizer composition is provided that includes boron and sulfur. The fertilizer composition can be a controlled release fertilizer that includes elemental sulfur, an anhydrous boron-containing compound, and a swelling material. The fertilizer composition can be produced by mixing molten elemental sulfur with the anhydrous boron-containing compound and cooling the mixture.

14 Claims, 2 Drawing Sheets

FERTILIZER COMPOSITION CONTAINING SULFUR AND BORON

TECHNICAL FIELD

The present disclosure is generally directed to fertilizers containing boron and sulfur, and methods of making the same. More particularly, aspects of this disclosure are directed to fertilizer compositions that contain sulfur, an anhydrous boron-containing compound, and a swelling material.

BACKGROUND

In the agriculture industry, fertilizers are used to provide nutrients to plants that are typically delivered to the plants through the soil. Fertilizers can be added to soil in granular or pastille form, for example, which are beneficial from the perspective of storage and dissemination capabilities.

Sulfur is an essential plant nutrient that has been included in fertilizer compositions to improve crop performance.

Boron is also an essential plant nutrient that can improve crop growth and yield. Although boron deficiency is not a common disorder affecting plants, areas of high rainfall and leached soils are more likely to have crops with boron deficiencies. For example, soils in the interior of British Columbia and Brazil are considered to be boron deficient. Boron deficient soil can be associated with low crop yields. However, at elevated levels, boron is considered toxic to both plants and essential microorganisms that are present in soil.

SUMMARY

This disclosure relates to fertilizer compositions that include sulfur and boron, and more specifically to controlled release fertilizer compositions that release a controlled quantity of plant available sulfur into the soil over time and provide a more rapid availability of boron when wetted.

Before sulfur and boron can be used by a plant, the sulfur must be converted to sulfate by microorganisms and the boron must be made soluble. The soil pH affects the availability of boron to plants. Plant available boron increases when the pH of the soil decreases. Sulfur can decrease the pH or acidify soil. As such, a fertilizer composition combining sulfur and boron can provide synergistic effects with respect to the availability of boron, especially when soil pH is above the optimum range for plant growth. Also, as demonstrated in this disclosure, incorporating boron into sulfur-based fertilizer compositions improves the availability of the sulfur component, which should improve crop performance.

The inclusion of boron compounds with sulfur-based fertilizers has been associated with serious difficulties. For example, when borate compounds are added as a boron source to molten elemental sulfur, flashing or foaming of the mixture can occur that renders the composition unusable in fertilizer production machinery. In particular, it has been difficult to produce granular or pastille fertilizers that contain boron and sulfur due to inconsistencies in particle size, uniformity and release characteristics. For example, attempts by the applicants to produce such fertilizers consistently failed because the fertilizers had immeasurable or extremely low amounts of boron in the finished product, and it was believed that the boron dropped out of the mixture during production or was otherwise inconsistently distributed in the composition. As a result of these difficulties, sulfur-based fertilizers having boron in any appreciable amount have not been commercially feasible.

Fertilizing crop fields with a boron-containing fertilizer and a separate sulfur-based fertilizer can also be problematic. In particular, commercially available boron fertilizers are typically formed as very small granules having a much smaller particle size than sulfur-based fertilizers. When the two fertilizers are applied to a field, the smaller size boron fertilizer tends to settle to the bottom of the fertilizer equipment (e.g., hopper), which causes an uneven distribution of the boron fertilizer throughout the field. This can cause boron "hot spots" that can be toxic to some plants.

In some aspects, this disclosure relates to a manufacturing method for making a fertilizer composition that includes sulfur and boron. The method includes steps of mixing molten elemental sulfur and an anhydrous boron-containing compound, and cooling the mixture to obtain the fertilizer composition.

In other aspects, this disclosure relates to a fertilizer composition including sulfur and boron that is produced by mixing an anhydrous boron-containing compound with molten elemental sulfur.

In still other aspects, this disclosure relates to a controlled release fertilizer composition that includes at least 50 weight percent of elemental sulfur, a boron-containing compound that is present in amounts such that the fertilizer composition includes from 0.5 to 10 weight percent of boron based on the weight of elemental boron, and a swelling material that expands when wetted. The boron-containing compound can be substantially uniformly dispersed throughout the fertilizer composition.

DETAILED DESCRIPTION

Figure 1:
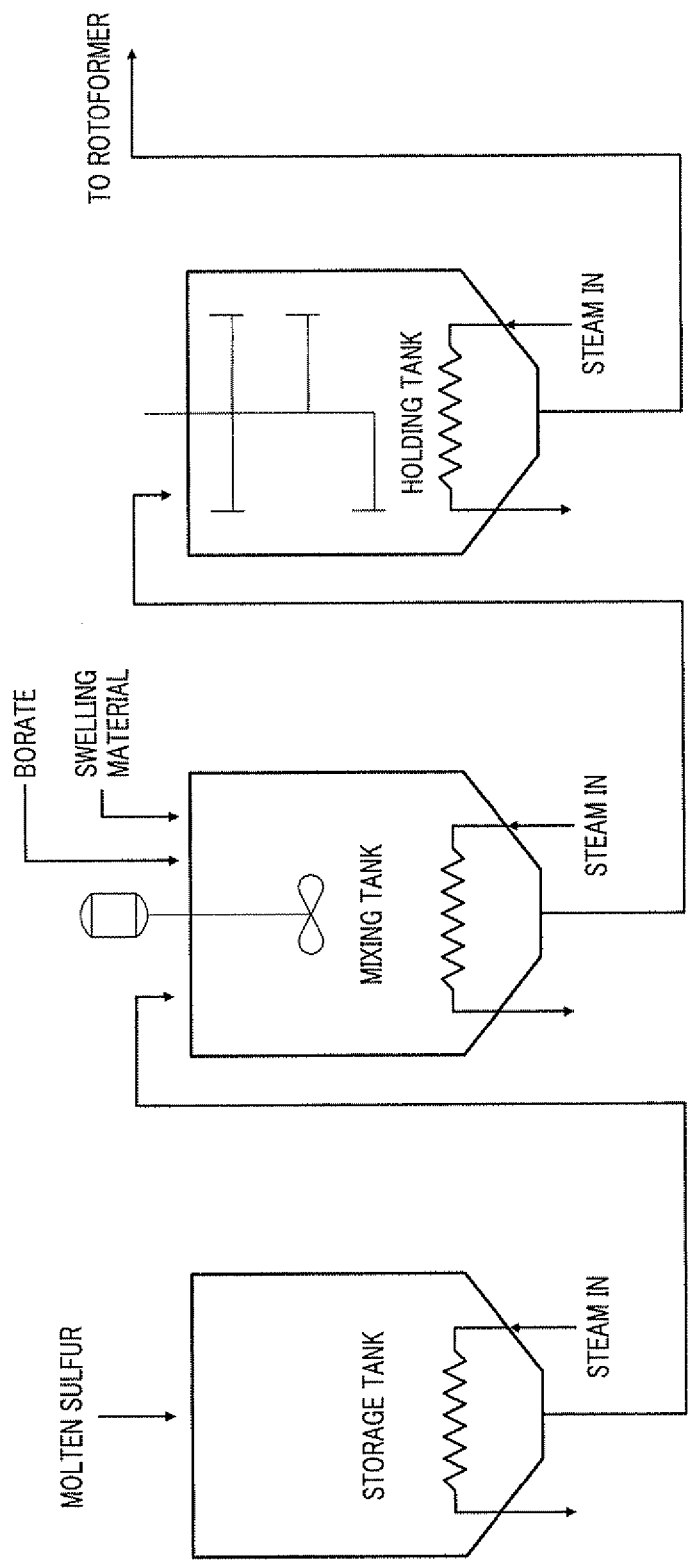
FIG. 1 is a schematic diagram illustrating an exemplary process for producing a fertilizer composition.

The present disclosure provides a fertilizer composition that includes sulfur and boron. The fertilizer composition can be a sulfur-based controlled release rate fertilizer that includes a material that swells or expands upon contact with water.

The sulfur component can be provided as elemental sulfur or a sulfur-containing compound. As discussed in connection with the production of fertilizer pastilles below, the use of elemental sulfur is preferred and can be provided in molten form and mixed with the other fertilizer components. If elemental sulfur is used, it can be at least about 95%, at least about 99% or at least about 99.5% pure.

The sulfur typically constitutes the bulk of the fertilizer composition (i.e., at least about 50 weight percent) and can form the matrix of the fertilizer in which the other components are distributed. In some aspects, the sulfur can be present in the fertilizer composition in an amount of from about 40% to about 95% by weight, from about 60% to about 90% by weight, from about 70% to about 85% by weight, or from about 80% to about 85% by weight, based on the weight of elemental sulfur. As used herein, the term "about" will be understood to broaden the ranges somewhat to include values that may be attributable to known errors in measurement, compounding the fertilizer composition, or expected variations in raw material compositions.

The boron can be provided as a boron-containing compound, including borates, such as borax, and boric acid compounds. Suitable borate compounds can include salts such diborates, triborates, or tetraborates. For example, disodium tetraborate is one preferred example of a boron-containing compound. The percentage of elemental boron in the boron-containing compound may vary depending on the boron-containing compound, the source, the handling of the material, and other factors. For example, anhydrous disodium tetraborate typically contains about 21% weight or about 22% weight elemental boron.

In some aspects, the boron-containing compound can be anhydrous, such that the moisture content is at least below about 3% by weight and preferably at least below about 1% by weight. Optionally, boron-containing compounds having higher moisture content can be dried down to the aforementioned levels before incorporating into the fertilizer composition. Also, anhydrous boron-containing compounds should be kept dry prior to inclusion in the fertilizer composition to preserve the anhydrous nature of the product. In some aspects, the anhydrous boron-containing compound can be kept sealed in a closed, conditioned environment. The boron-containing compound can also be heated or desiccated until just prior to being mixed with other components in the fertilizer composition.

It was discovered in connection with this disclosure that the use of anhydrous boron-containing compounds enables boron plant nutrients to be incorporated into a sulfur-based fertilizer in consistent, reproducible amounts without causing problems with flashing or foaming as discussed above. One suitable form of boron is anhydrous borax, disodium tetraborate, which is available from Rio Tinto under the trade name DEHYBOR®. DC DEHYBOR® is a product obtained from the Rio Tinto dust collectors, and has a very fine mesh particle size (about 270-mesh). In some embodiments, the anhydrous borax material can have a particle diameter of less than about 100 microns ($\mu$m) (where at least 85% of the particles have this size), and preferably less than about 75 $\mu$m and less than about 55 $\mu$m. The use of such fine borate particles can be advantageous because the fine borate powder is generally considered a waste product of the process for preparing larger mesh sizes, e.g., 30-mesh borate. Thus, the present disclosure includes an unexpected use for such product waste streams, contributing to more economical and environmental friendly operations.

The fertilizer composition can include boron in amounts of from about 0.5% to about 10% by weight, from about 1% to about 5% by weight, from about 0.5% to about 2.5% by weight or from about 1% to about 2% by weight, based on the weight of elemental boron. In this context, the weight percent is provided as an elemental weight percent and is based on the weight percentage of boron atoms in the composition.

The boron-containing compound is preferably substantially uniformly incorporated in the fertilizer composition, e.g., it can be dispersed substantially uniformly in the sulfur matrix such that there is no more than a 10% variation of boron content in samplings. Desired uniformity can be achieved by ensuring sufficient mixing of the fertilizer components and by using a boron-containing compound that is compatible with the elemental sulfur matrix. Because boron is a micronutrient, a major challenge in the application to soil (e.g., dispersing throughout a field) and manufacture of micronutrients is to ensure that there is a homogeneous distribution of the very small amounts of such materials. Avoidance of "hot spots" in soils due to non-uniform distribution is an important feature of soil management.

To further this goal, the fertilizer composition can be a controlled release fertilizer composition that includes:
(i) a sulfur component;
(ii) a boron component; and
(iii) a swelling material that expands when wetted.

Controlled release fertilizer compositions release plant nutrients in controlled amounts over time when the composition is wetted. As the term is used herein, "controlled release" is intended to refer to the gradual release of the sulfur component from the fertilizer composition and does not necessarily refer to the boron component. The boron component may or may not be released at controlled rates. The controlled release compositions are typically provided in granule, pellet, pastille, or particulate form. The fertilizer composition can be, in one embodiment, generally spherical, or in another embodiment, can be a generally pastille form. The spherical or pastille form of granulated fertilizer particles can help to reduce the generation of fines due to abrasive inter particle interaction which, in turn, reduces the amount of such fines being rendered airborne as dust, increasing the amount of fertilizer ultimately deposited on specific piece of soil while simultaneously reducing waste. Some embodiments can include fertilizer pellets having a diameter of about 0.5 to about 4 mm, or about 1 to 3 mm, or about 2.5 mm.

The swelling material in the fertilizer composition expands when wetted. In pastille or pellet form (or similar), the expansion can allow moisture into the pastille and can break the sulfur into smaller particles, which allows microorganisms that are present in the soil to convert the sulfur into the plant-useable sulfate form. The sulfate form is released into the soil where it can be used by plants. When the elemental sulfur is formulated with swelling clay, the bulking properties of the sulfur, the controlled rate of its breakdown, and the release of any contained micronutrients should be considered.

The swelling material can include a swelling clay, such as high swelling bentonite clay. One suitable bentonite clay product is CANAPRILL PLUS available from Canadian Clay Products (Wilcox, Saskatchewan) that has a 200 mesh particle size (85-95%). Another suitable bentonite swelling clay is available from Muldoon Minerals, Inc. (Muldoon, Tex.).

The swelling material can be present in the fertilizer in amounts of about 2% to about 30% by weight, from about 5% to about 25% by weight, from about 5% to about 15% by weight, and preferably from about 8% to about 12% by weight.

The fertilizer composition can also optionally include other plant nutrients including nitrogen, phosphorous, potassium, iron, copper, zinc, manganese, magnesium or combinations of the foregoing. These components can be present in the fertilizer composition in amounts of from about 0.25% to about 40% by weight, from about 0.5% to about 20% by weight, or from about 1% to about 5% by weight, based on elemental weight.

Exemplary controlled release rate fertilizers containing boron may be manufactured by mixing molten sulfur with a boron-containing compound, preferably an anhydrous borate compound as discussed above. The molten sulfur can be first mixed with a swelling material, and in some embodiments, a swelling clay and then the boron-containing compound can be added to the mixture of molten sulfur and the swelling clay. Alternatively, the boron-containing compound can be first mixed with the molten sulfur and then the swelling clay can be subsequently added.

The order of addition or mixing is not particularly limited. In some embodiments, a portion of the sulfur and all of the swelling clay may be first mixed, then the boron-containing compound can be added to the mixture of swelling clay and sulfur, and then the remainder of the molten sulfur may be added to the mixture. In some embodiments, the swelling material and/or the boron-containing compound can be heated prior to their addition to the mixture.

The fertilizer composition may be manufactured using a batch method or a continuous flow method. The exemplary methods described in connection with FIGS. 1 and 2, discussed below, are not meant to limit the method of production to a particular method of manufacture.

FIG. 1 shows an exemplary process for manufacturing a controlled release rate fertilizer containing boron. Molten sulfur having a temperature of about 250° F. is added to a storage tank. Heat is then added to the storage system through a superheated steam line. In an alternative embodiment, non-molten sulfur can be heated to a molten state and then added to the storage tank.

The sulfur is then transported to a mixing tank. The molten sulfur can be pumped and metered into the mixing tank. The mixing tank then mixes the molten sulfur while the boron-containing compound and swelling material are added. In one embodiment, the swelling clay, which can be bentonite clay, is added to the continuously stirred molten sulfur. Anhydrous borate is then added to the mixture of molten sulfur and clay. The mixture is then allowed to mix in the mixing tank for sufficient time to create a substantially homogenous mixture. In one embodiment, the mixture can be mixed for about 1 minute to about 10 hours, from about 10 minutes to about 5 hours, from about 15 minutes to about 1 hour, or for about 30 minutes. Heat is added to the system to keep the temperature well above the melting point of sulfur, e.g., at about 270° F., during the mixing process.

After the mixing process is complete, the molten mixture can then be placed in a holding tank, tanker for shipping, or alternatively can be pelletized in a rotoformer. In one embodiment, the holding tank can also be stirred to ensure the molten mixture remains substantially homogenous. Additionally, as shown in FIG. 1, heat may be added to the holding tank, for example through a steam line. When needed, the molten mixture can then be transferred to a rotoformer.

Figure 2:
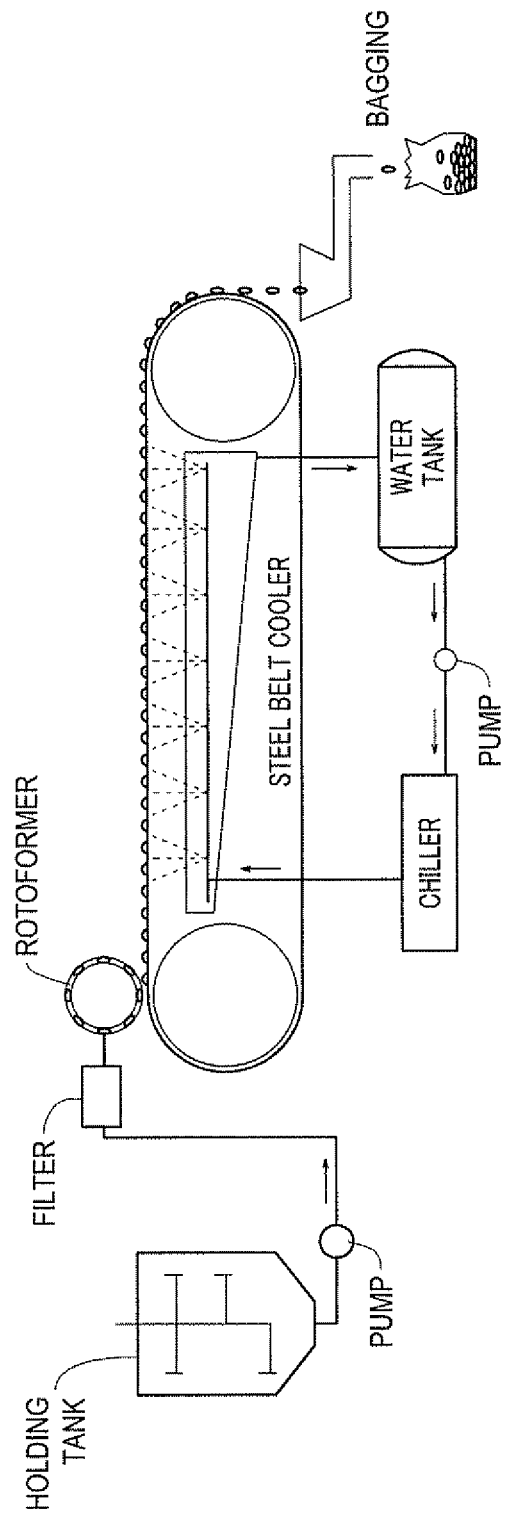
FIG. 2 is a schematic diagram illustrating an exemplary process for producing fertilizer pastilles with a rotoformer machine.

FIG. 2 is a schematic diagram illustrating an exemplary process for producing fertilizer pastilles with a rotoformer. The molten mixture is pumped from the holding tank through a filter, which may be a 270-mesh sized filter, for example. The filter can alternatively be a 140-mesh, 230-mesh, 325-mesh or 400-mesh filter. The molten mixture is then pumped through a rotoformer onto a steel belt. After the molten mixture passes through the rotoformer onto the steel belt, the molten mixture is then cooled on the belt to form pastilles. In one embodiment, the steel belt can be additionally cooled by spraying cooled water on the undercarriage of the steel belt. The water can be recycled and chilled prior to use in the sprayers. The molten mixture can also be cooled by allowing the mixture to equilibrate with room temperature. After the pastilles sufficiently harden, they can be removed from the belt with a blade, and then either put into storage for bulk shipment or packaged in smaller bags for distribution.

EXAMPLES

A first exemplary embodiment of a controlled release rate fertilizer contains about 2% boron. The fertilizer contains about 80.5% sulfur, about 10.0% bentonite clay, and about 9.5% DEHYBOR®. Because the DEHYBOR® contains about 21.47% elemental boron, the controlled release rate fertilizer contains about 2% elemental boron.

A second exemplary embodiment of a controlled release rate fertilizer contains about 1% boron. The fertilizer contains about 85.34% sulfur, about 10.00% bentonite, and about 4.66% DEHYBOR®. Because the DEHYBOR® contains about 21.47% elemental boron, the controlled release rate fertilizer contains about 1.00% elemental boron.

A third exemplary embodiment of a controlled release rate fertilizer contains 1% boron. The fertilizer contains about 85.11% sulfur, about 10.00% bentonite, and about 4.89% DEHYBOR®. Because the DEHYBOR® contains about 21.47% elemental boron, the controlled release rate fertilizer contains about 1.05% elemental boron.

Production Example 1

A 15 metric ton batch size of the controlled release rate fertilizer composition containing elemental boron was created. First, 10 metric tons of molten sulfur at about 250° F. was metered into a batch tank. Then, with the mixer on, 1.5 metric tons of bentonite clay was added into the batch tank. After the addition of the bentonite clay was completed, 1.432 metric tons of DC DEHYBOR® was slowly added to the mixture which was being simultaneously mixed in the batch tank with the temperature of the tank remaining substantially constant.

After the mixture was allowed to thoroughly mix, an additional 2.0675 metric tons of molten sulfur was then metered into the tank. The tank was then mixed thoroughly for about 30 minutes. After mixing was complete, the solution was pumped through a 270-mesh filter to heated storage tanks. The material was then pumped to a rotoformer where the mixture was deposited on a stainless steel belt and was formed into pastilles.

The finished product was cooled on the stainless steel belt and then stored and kept dry in plastic lined bags stacked on pallets to ensure moisture was not introduced into the finished fertilizer.

The resulting fertilizer comprised about 2% elemental boron, about 84.5% elemental sulfur, about 10% bentonite clay, with the remainder being other components from the DC DEHYBOR®.

Production Example 2

A 10 short ton batch of fertilizer composition was produced. 17,068.47 pounds of molten sulfur and 2,000.00 pounds of bentonite clay were added to a batch tank with the mixer on and the temperature of the tank remaining substantially constant. Then 931.53 pounds of DC DEHYBOR® was added to the mixture. The mixture was then thoroughly mixed for about 30 minutes. After mixing was complete, the solution was pumped through a 270-mesh filter to heated storage tanks. The material was then pumped to a rotoformer where the mixture was deposited on a stainless steel belt and was formed into pastilles.

The controlled release rate fertilizer contains about 1% elemental boron, 85.34% elemental sulfur, 10.00% bentonite clay, with the remainder being inert material from the DC DEHYBOR®.

Production Example 3

Another 10 short ton batch of fertilizer composition was produced. About 17,021.89 pounds of molten sulfur and about 2,000.00 pounds of bentonite clay were added to a batch tank with the mixer on. Then about 978.11 pounds of DC DEHYBOR® was added to the mixture. The mixture was then thoroughly mixed for about 30 minutes. After mixing was complete, the solution was pumped through a 270-mesh filter to heated storage tanks. The material was then pumped to a rotoformer where the mixture was deposited on a stainless steel belt and was formed into pastilles.

The controlled release rate fertilizer was then studied and was found to contain about 1.05% elemental boron, 85.11% elemental sulfur, 10.00% bentonite clay, with the remainder being inert material from the DC DEHYBOR®.

Analysis of Boron-Containing Fertilizers

Laboratory research trials were conducted to evaluate the potential benefits of adding an anhydrous boron-containing composition (anhydrous sodium tetraborate, $Na_2B_4O_7$) into sulfur-based controlled release fertilizers. The laboratory used for both Laboratory Trials was a member of the Canadian Association for Laboratory Accreditation and was International Organization for Standardization (ISO) 17025 certified.

Laboratory Trial 1

As discussed above, sulfur must be oxidized into sulfate before it can be used by plants. This study was conducted to evaluate the amount of sulfate that is released from two sulfur-based fertilizer compositions over a twelve week period.

In this trial, a native soil sample without any added plant nutrients is used as the control, TIGER 90CR® (Tiger-Sul Products) is a granular degradable sulfur-based fertilizer (about 90% sulfur by weight and about 10% bentonite swelling clay by weight) that does not include boron, and Tiger Micronutrients® w/1% Boron is a granular degradable sulfur-based fertilizer with boron incorporated into the granule in an amount of 1% by weight of elemental boron. The latter fertilizer includes about 86% sulfur by weight, about 10% bentonite swelling clay by weight, and balance anhydrous borax.

The soil in each sample was inoculated with microorganisms that oxidize sulfur. 250 mg of each fertilizer composition was added to 200 g of soil at 24% saturation. Water was periodically passed through the soil and collected at the intervals shown in Table 1. The water was analyzed for sulfate content. The results are shown in Table 1.

TABLE 1

Boron Influence on Sulfur (S) to Sulfate ($SO_4$) Oxidation

| | Sulfate Released (mg/L) | | | | |
|---|---|---|---|---|---|
| | Week 1 | Week 3 | Week 6 | Week 9 | Week 12 |
| Control | 29 | 44 | 39 | 38 | 41 |
| Tiger 90CR® | 52 | 156 | 370 | 577 | 651 |
| Tiger Micro-nutrients® w/1% Boron | 142 (173% increase over Tiger 90CR®) | 627 (302% increase over Tiger 90CR®) | 1584 (328% increase over Tiger 90CR®) | 1591 (176% increase over Tiger 90CR®) | 1656 (154% increase over Tiger 90CR®) |

As can be seen from Table 1, there is a synergistic effect between sulfur and boron in which the presence of boron in the fertilizer granule substantially increases the release of sulfate. For example, as compared to a comparable fertilizer product containing no boron (Tiger 90CR®), the boron-containing fertilizer released more than 2.5 times the amount of sulfate at 1 and 12 weeks, and showed even greater increases in the intervening sampling periods.

The oxidation of sulfur into sulfate is typically accomplished through microorganisms in the soil. However, because the plant available version of boron can be toxic in excessive amounts, it was believed that a fertilizer mixed with elemental sulfur and boron would be toxic to the microorganisms present in soil, which are necessary for the oxidation of sulfur into sulfate. Based on this toxicity of boron, it was expected that the release rate of plant soluble sulfate would have decreased. To the contrary, the sulfur-based fertilizer with 1% boron in this trial was shown to significantly facilitate the oxidation of sulfur to sulfate.

Laboratory Trial 2

A second laboratory trial (see Table 2 below) was conducted to confirm the study conducted in Laboratory Trial 1. Both fertilizers (Tiger 90CR® and Tiger Micronutrients® w/1% Boron) had the same composition as the fertilizers used in Laboratory Trial 1.

Table 2 illustrates the results of the second laboratory trial in which the three fertilizers were compared. The second laboratory trial was done with native soil under the same controlled laboratory conditions as was done in the first study. In the second study, the amount of sulfate released was also measure five different times over a twelve week period.

TABLE 2

Boron Influence on Sulfur (S) to Sulfate ($SO_4$) Oxidation

| | Sulfate Released (mg/L) | | | | |
|---|---|---|---|---|---|
| | Week 1 | Week 3 | Week 6 | Week 9 | Week 12 |
| Control | 86 | 86 | 102 | 106 | 155 |
| Tiger 90CR® | 138 | 395 | 525 | 713 | 926 |
| Tiger Micro-nutrients® w/1% Boron | 285 (107% increase over Tiger 90CR®) | 746 (89% increase over Tiger 90CR®) | 1093 (108% increase over Tiger 90CR®) | 1178 (65% increase over Tiger 90CR®) | 1500 (62% increase over Tiger 90CR®) |

As can be seen in Table 2, the synergistic effect between sulfur and boron was confirmed. The fertilizer with 1% boron was able to facilitate the oxidation of sulfur to sulfate, increasing the amount of sulfate released from the controlled release fertilizer for the entire twelve week period.

The Laboratory Studies demonstrate that there is a significant synergistic effect between sulfur and boron that should stimulate greater provision of plant nutrients to enhance both sulfate availability and crop productivity.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method of manufacturing a fertilizer composition containing sulfur and boron, the method comprising:
    mixing molten elemental sulfur and an anhydrous boron-containing compound; and
    cooling the mixture to obtain the fertilizer composition.

2. The method of claim 1, wherein the anhydrous boron-containing compound is an anhydrous borate compound or an anhydrous boric acid compound.

3. The method of claim 2, wherein the anhydrous boron-containing compound is an anhydrous borate compound.

4. The method of claim 3, wherein the anhydrous borate compound is anhydrous sodium tetraborate.

5. The method of claim 1, further comprising mixing a swelling material with the molten sulfur and the anhydrous boron-containing compound.

6. The method of claim 1, wherein the anhydrous boron-containing compound has a moisture content of less than about 1% by weight.

7. The method of claim 1, wherein the fertilizer composition includes from about 0.5 to about 10 weight percent of boron based on the weight of elemental boron.

8. The method of claim 1, wherein the fertilizer composition includes from about 1 to about 5 weight percent of boron based on the weight of elemental boron.

9. The method of claim 1, wherein the fertilizer composition includes from about 0.5 to about 2.5 weight percent of boron based on the weight of elemental boron.

10. The method of claim 1, wherein the fertilizer composition includes from about 1 to about 2 weight percent of boron based on the weight of elemental boron.

11. The method of claim 1, wherein the molten elemental sulfur is at least about 95% pure elemental sulfur.

12. The method of claim 1, wherein the molten elemental sulfur is at least about 99.5% pure elemental sulfur.

13. The method of claim 1, further comprising forming the composition into pastilles, pellets, or granules and then cooling the composition to below the melting point of sulfur in the cooling step.

14. The method of claim 5, wherein the swelling material comprises bentonite clay.

* * * * *